Nov. 27, 1945.  A. KYLE ET AL  2,389,858
TOOL HOLDER ASSEMBLY
Filed March 15, 1943  3 Sheets-Sheet 1
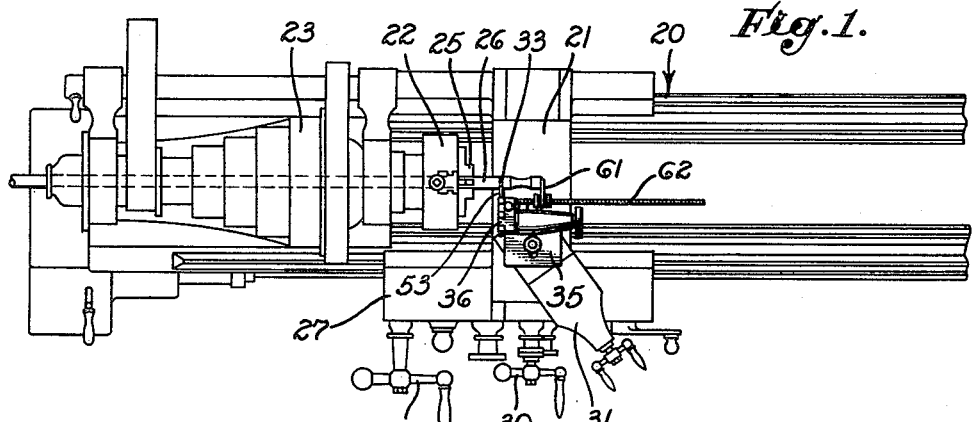
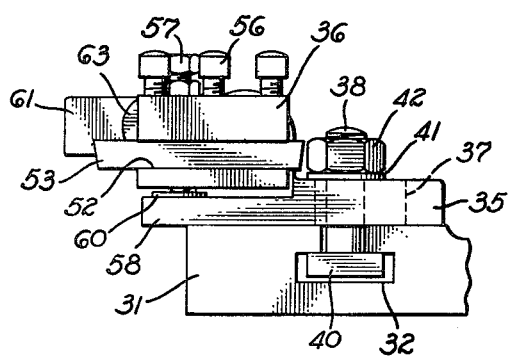
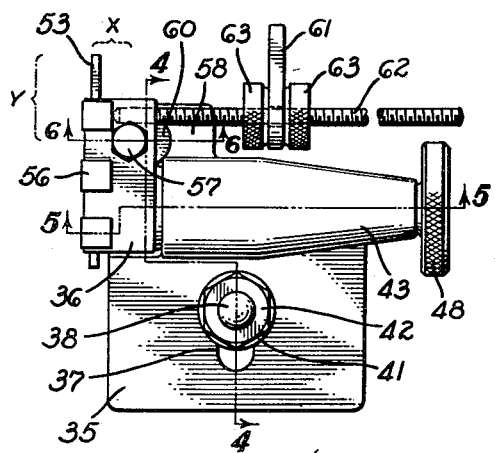
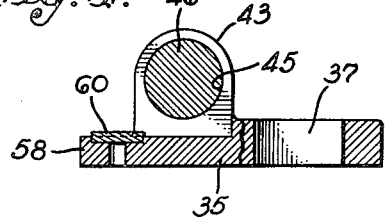
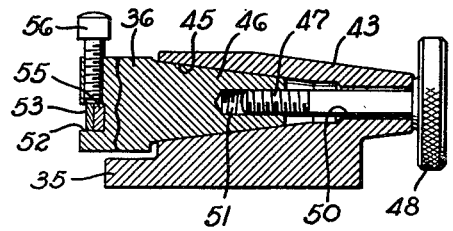
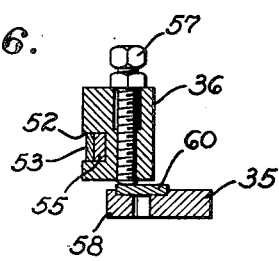
INVENTORS
ANTHONY KYLE
JOHN A. JOHNSON
BY HARRIS, KIECH, FOSTER & HARRIS
FOR THE FIRM
ATTORNEYS.

Nov. 27, 1945.    A. KYLE ET AL    2,389,858
TOOL HOLDER ASSEMBLY
Filed March 15, 1943    3 Sheets-Sheet 2
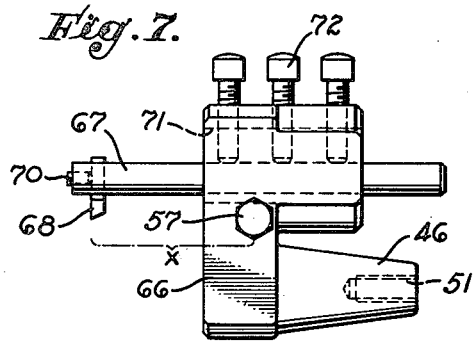
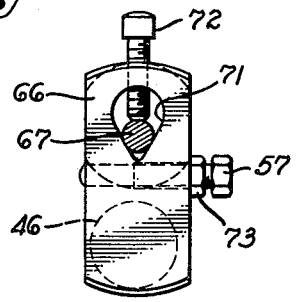
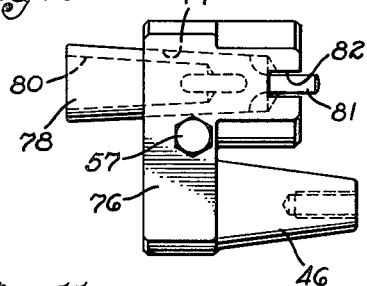
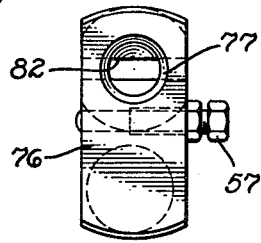
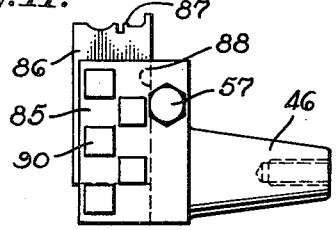
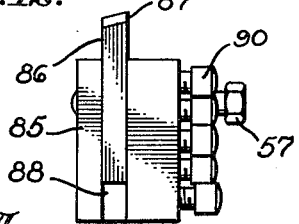
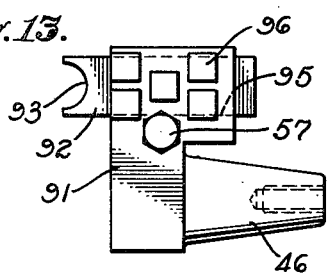
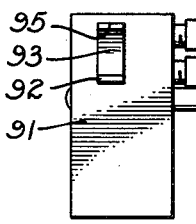
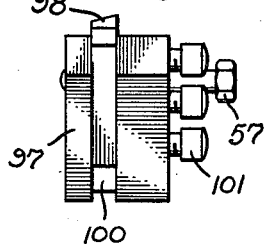
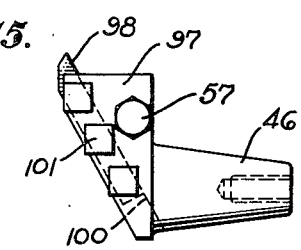
INVENTORS
ANTHONY KYLE
JOHN A. JOHNSON
BY
HARRIS, KIECH, FOSTER & HARRIS
FOR THE FIRM
ATTORNEYS.

Nov. 27, 1945.　　　A. KYLE ET AL　　　2,389,858
TOOL HOLDER ASSEMBLY
Filed March 15, 1943　　　3 Sheets—Sheet 3
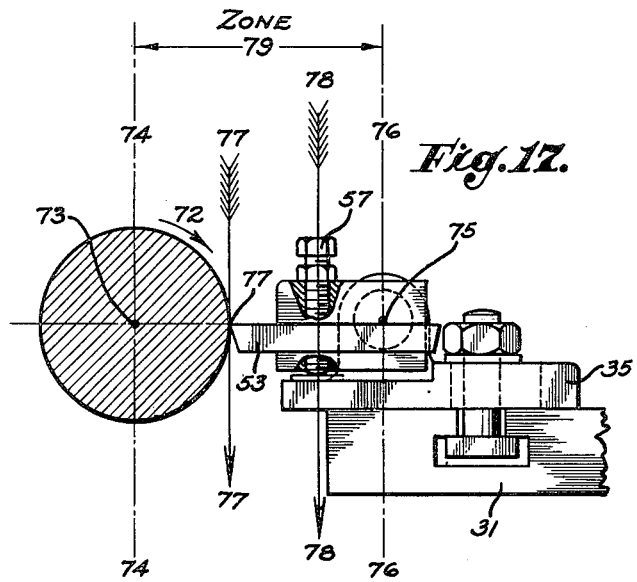
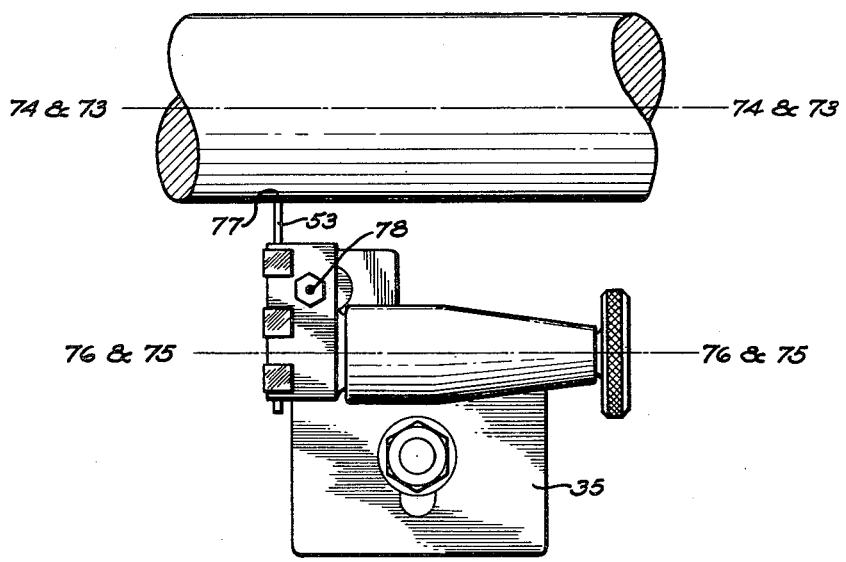
INVENTORS
ANTHONY KYLE
JOHN A. JOHNSON
BY
HARRIS, KIECH, FOSTER & HARRIS
FOR THE FIRM
ATTORNEYS.

Patented Nov. 27, 1945

2,389,858

UNITED STATES PATENT OFFICE 2,389,858

TOOLHOLDER ASSEMBLY

Anthony Kyle and John A. Johnson,
Los Angeles, Calif.

Application March 15, 1943, Serial No. 479,208

4 Claims. (Cl. 82—36)

Our invention relates to tool holding devices and is directed specifically to the construction of a quickly detachable tool holder that may be repeatedly mounted on a machine at pre-set adjustment of the tool carried by the holder with respect to a work piece in the machine. While, obviously, the invention is widely applicable, it is being initially embodied in a tool holder assembly for use on lathes and the like. For the purpose of the present disclosure, we elect to describe such an embodiment in the knowledge that our description will be adequate guidance for applying the principles of the invention to other specific purposes and in other fields.

In lathe work, considerable non-productive time is necessarily spent on setting up and adjusting tools preliminary to machining operations. Often a given operation with a given tool adjustment is repeated at intervals. For example, there may be need to perform a certain machining operation occasionally in a machine shop. Again, a lathe may be employed to machine a run of articles in a procedure that requires changing tools in the course of each cycle of operation on the individual articles. In either event, considerable time may be saved by employing a tool holder which will maintain a selected adjustment and which may be quickly mounted on a lathe to achieve the predetermined adjustment automatically in the mounting procedure without any special attention or care on the part of the operator.

It is one object of our invention to provide an efficient tool holder of relatively simple construction that may be set for a given adjustment, quickly detached from a lathe, and subsequently replaced on the lathe at precisely the same setting. It is contemplated that such a tool holder may be initially adjusted for an initial operation and that no further time will be required for adjusting the tool holder whenever the tool holder is again employed on the lathe after a lapse of time.

Another object of our invention is to provide a tool holder assembly that includes a plurality of quickly interchangeable tool holders whereby different tools may be mounted on a machine successively for repeated cycles of operation without taking time for tool adjustment in each successive cycle. By making such a tool holder assembly available, we make it possible, in effect, to employ an ordinary engine lathe in the same manner as a turret lathe. Ordinarily, a short run of articles requiring successive operations by successive tools cannot be produced economically on a turret lathe because of the disproportionate cost of setting up the turret lathe and cannot be performed economically on an engine lathe because of the time lost in changing tools and in adjusting the tools prior to each operation. The contemplated tool holder assembly makes the use of an engine lathe economical for this purpose by reducing to a minimum the time required for changing tools and by eliminating the necessity for adjusting or setting the tools after the first cycle of operation.

Our invention involves the use of a tool base adapted to be mounted on a lathe or the like in combination with a plurality of tool holders adapted to be mounted interchangeably on this base. One of the difficult problems met in designing such a tool holder assembly is that of achieving a wide range of adjustment for the successive tools. It is not difficult to design tool holders for interchangeable mounting on a common base, but it is difficult to arrive at a mechanically efficient method of interchangeably mounting the successive tool holders without restricting the range to which the individual tool holders may be adjusted relative to the common base. An important object and feature of our invention is the achievement of a wider range of adjustability in this respect than afforded by prior devices of the same type.

Other objects of our invention relate to what may be described as reduction of overhang, the term "overhang" referring to the dimension of that portion of the tool holder together with the associated tool that extends toward the work in the machine in an unsupported manner. The base on which the tool holder is mounted is necessarily displaced from or spaced from the point at which the tool cuts the material of the work piece in the machine. The overhang of the tool in the tool holder assembly is the distance from the cutting end of the tool to the nearest point of support for the tool holder on the tool base. The overhang may be considered as divided into two components, i. e., longitudinal overhang measured in a direction parallel to the longitudinal axis of the machine and lateral overhang measured perpendicularly of that axis. We propose to reduce substantially both the lateral and longitudinal overhang. In this regard, one of the special objects sought in one practice of our invention is to so mount boring and drilling tools relative to the tool base as to minimize longitudinal overhang. Another special object is to utilize the means of adjustment of each tool holder as means for minimizing lateral overhang.

A still further object in one practice of our invention is to provide for the employment of standard sleeves for drill shanks in those forms of our invention that are employed for drilling along the work axis of the lathe.

The above and other objects and advantages of our invention will be apparent in our following detailed description, taken with the accompanying drawings.

In the drawings, which are to be regarded as merely illustrative,

Fig. 1 is a plan view of an engine lathe showing a preferred form of our tool holder assembly mounted on the compound slide or rest of the lathe;

Fig. 2 is a side elevation on an enlarged scale of the tool holder assembly employed in Fig. 1, the tool holder assembly being shown turned into alignment with the T-slot of the compound slide for clarity;

Fig. 3 is a plan view of the tool holder assembly shown in Fig. 2;

Fig. 4 is a transverse section taken as indicated by the irregular line 4—4 of Fig. 3;

Fig. 5 is a longitudinal section taken as indicated by the irregular line 5—5 of Fig. 3;

Fig. 6 is a transverse section taken as indicated by the line 6—6 of Fig. 3;

Figs. 7 and 8 are plan and end views respectively of a tool holder employed for a boring operation;

Figs. 9 and 10 are similar views of a tool holder employed for drilling and reaming operations, an associated sleeve for drill shanks being shown in Fig. 6;

Figs. 11 and 12 are similar views of a tool holder adapted for lateral forming operations;

Figs. 13 and 14 are similar views of a tool holder adapted for end cutting or forming operations;

Figs. 15 and 16 are similar views of a tool holder designed for threading and turning operations;

Fig. 17 is a side elevation similar to Fig. 2 but in which the relationship of the tool holder to the work is more clearly shown than in Fig. 2; and Fig. 18 is a plan view similar to Fig. 3 but in which the relationship of the tool holder to the work is shown in a manner similar to the showing in Fig. 17.

Fig. 1 shows a conventional engine lathe having a bed 20, a carriage 21, and a head stock 22, the tail stock being omitted as unnecessary in a simple practice of our invention. The head stock 22 includes the usual cone pulley 23 mounted on a hollow spindle (not shown) that leads to a chuck 25. Fig. 1 shows a work piece 26 in the form of a length of round stock extending through the head stock 22 toward the carriage 21, the work piece being releasably gripped by the chuck 25 for rotation.

The carriage 21 is shown with a conventional apron 27 housing the usual feeding mechanism including a feed crank 28 for causing the carriage to traverse the length of the bed 20 and including a feed crank 30 for causing the carriage to move transversely of the lathe bed 20. The lathe is, of course, provided with the usual indices to indicate the longitudinal and lateral positions of the carriage relative to the lathe bed. Since the work axis of the machine, that is to say, the axis about which the head stock rotates the work piece 26, is fixed relative to the lathe bed, it is apparent that the feed indices of the lathe indicate the positions of any tool on the carriage 21 with respect to the work axis.

The carriage 21 is provided with the usual compound slide 31, which compound slide is rotatable about a vertical axis relative to the carriage. A preferred form of our tool holder assembly is shown mounted on the compound slide 31. In Fig. 1 the compound slide 31 is swung to one side, the tool holder assembly being positioned diagonally thereof. Fig. 2, however, shows the tool holder assembly aligned perpendicular to one side edge of the compound slide 31 to reveal the manner in which the tool holder assembly is anchored to the T-slot 32 of the compound slide.

The particular tool holder assembly shown in Figs. 1 to 6 is employed to make a transverse cut 33 to sever an end portion of the work piece 26 after the end portion has been shaped by other tools. The tool holder assembly in Figs. 1 to 6 comprises a base 35 and a tool holder 36 that is removably mounted thereon in a pivotal manner. The base 35 is formed with a short slot 37 to receive an anchoring stud 38, the anchoring stud extending upward from a retaining member 40 in the T-slot 32 and carrying a washer 41 and retaining nut 42.

Since the tool holder 36 is to be pivotally mounted on the base 35 and is to be releasable from the base, it is necessary to provide the base with some pivot means for cooperation with some complementary pivot means on the tool holder in such manner as to permit ready mutual engagement and disengagement of the two pivot means. In the preferred practice of our invention the base 35 is formed with an integral bearing portion 43 on its upper side, which bearing portion forms a suitable pivot socket 45 to receive a pivot spindle 46 carried by the tool holder 36. While the pivot socket 45 and the pivot spindle 46 may be of cylindrical configuration, we prefer a conical configuration to achieve highly accurate positioning of the tool holder relative to the base and to preclude any looseness of fit between the two pivot means.

To provide for effectively engaging the pivot spindle 46 with the pivot socket 45 and to maintain such engagement, we may employ means such as a large screw 47 having a knurled head 48 of relatively large diameter for convenient manipulation. The screw 47 extends loosely through an axial bore 50 in the bearing portion 43 and threads into an axial bore 51 in the end of the pivot spindle 46. It is apparent that the pivot spindle 46 may be inserted in the pivot socket 45 and quickly engaged by the manually operable screw 47 to draw into tight contact the two conical surfaces involved.

The particular tool holder 36 shown in Figs. 1 to 6 is provided with a side recess or channel 52 to receive a cut-off tool 53, the tool lying against a spacer 55 and being firmly retained in the channel by three square-headed screws 56. The head stock 22 is rotated in a direction to move the material of the work piece 26 downward across the end of the cut-off tool 53 so that in reaction to the cutting operation the tool holder 36 tends to rotate downward toward the level of the underlying base 35. A feature of our invention is the concept of extending the base 35 under the tool holder 36 in the direction of the work axis of the machine for the purpose of providing additional support for the tool holder, and for the additional purpose of employing adjustable means effective between the tool holder and the base to limit rotation of the tool holder toward the base. In other words, we contemplate extending the base 35 into the zone defined by a first vertical plane through the pivotal axis of the tool holder 36 and a second vertical plane through the work axis of the machine, and adjustably supporting the tool holder from the base in this zone.

Obviously, the adjustable means for limiting the degree to which the tool holder 36 rotates toward the base 35 in response to a cutting operation may be carried by the base 35, or may be carried by the tool holder 36, or may be a simple separate spacer means for insertion between the base and the tool holder. In our preferred arrangement we mount a simple setscrew 57 through the tool holder 36 for adjustable contact with a support surface 58 of the base 35 in the aforementioned zone. To minimize wear by the setscrew 57, the support surface 58 of the base 35 may be provided by a hard metal insert 60.

A feature of the particular tool holder 36 shown in Figs. 1 to 6 is that the tool holder is provided with a suitably adjustable gauge for guidance in positioning the cut-off tool 53 relative to the end of the work piece 26. For this purpose we show a gauge arm 61 loosely mounted on a threaded rod 62 carried by the tool holder 36, the gauge arm being adjustably retained by two opposed knurled nuts 63.

The manner in which the construction shown in Figs. 1 and 6 may be employed in the practice of our invention may be readily understood from the foregoing description. Let it be assumed that the tool holder 36 has been placed on a work bench in the course of a previous cycle of operation on the work piece 26 and that it is now desired to again employ the cut-off tool 53 to sever an end portion from the work piece. The operator picks up the tool holder 36, slips the pivot spindle 46 into the pivot socket 45 of the base and manipulates the knurled head 48 to cause the large screw 47 to pull the pivot spindle into place with sufficient tightness to preclude any play between the cooperating parts. Proper adjustment of the setscrew 57 having been attained accurately in a previous operating cycle and having been maintained effective between cycles by virtue of the setscrew fitting tightly in the tool holder, the setscrew in contacting the support surface 58 of the base accurately positions the cut-off tool 53 for the impending cut-off operation. It is apparent that the adjustment of the setscrew 57 determines the height of the cutting end of the tool 53 or the vertical spacing of the tool and relative to the work axis of the machine.

Figs. 7 to 16 show various forms of tool holders that may be interchangeably mounted on the base 35 in the practice of our invention. It will be noted that each of these interchangeable tool holders includes, as previously described, a pivot spindle 46 and is provided with the previously mentioned setscrew 57, the setscrew being positioned relative to the pivot spindle for contact with the metal insert 60 on the support surface of the base 35.

The tool support 66 in Figs. 7 and 8 is designed to carry a longitudinally positioned bar 67 for boring operations, a transversely positioned cutting tool 68 being retained at the end of the bar by a suitable setscrew 70. As best shown in Fig. 8, the tool support 66 is provided in a well-known manner with a longitudinal bore 71 of tapering cross section to receive the boring bar 67 and a number of square-headed screws 72 are employed to press the boring bar against the tapered side of the bore 71. As indicated in Fig. 8, the setscrew 57 may be provided with a nut 73 for locking the setscrew at any selected adjustment.

It is to be noted that the described arrangement permits the boring bar 67 to be set back inside the tool holder 66 so that there is very little longitudinal overhang, such overhang being the longitudinal distance between the adjustable setscrew 57 and the cutting tool 68. It will also be noted that the employment of the adjustable setscrew 57 reduces the lateral overhang to insignificance, since the cutting tool 68 extends substantially into the lateral zone represented by the setscrew 57. In the absence of the setscrew 57, the overhang would be the distance from the cutting tool 68 to the axis of the pivot spindle 46. In both Figs. 3 and 7 the longitudinal overhang is indicated by the dotted bracket $x$ and in Fig. 3 the lateral overhang is indicated by the dotted bracket $y$.

Figs. 9 and 10 show a tool holder 76 for holding drills and reamers. The tool holder 76 forms a conical socket 77 into which may be conically wedged a sleeve 78 having a standard socket 80 for drill shanks. The sleeve 78 is provided with a tail piece 81 that protrudes through a slot 82 on the rear face of the tool holder 76.

Figs. 11 and 12 show a tool holder 85 for laterally positioning a forming tool 86, the forming tool having a cutting end 87 of a desired configuration for movement laterally against a work piece in the lathe. The forming tool is shown mounted in a suitable slot or channel 88 and is retained therein by a number of square-headed screws 90.

The tool holder 91 in Figs. 13 and 14 is designed to carry a longitudinally positioned forming tool 92 having a cutting end 93 of a desired configuration to shape the end of a work piece in the lathe. The forming tool 92 extends through a slot or aperture 95 in the tool holder 91 and is retained by a number of square-headed screws 96.

Finally, the tool holder 97 in Figs. 15 and 16 is designed to hold in diagonal position a cutting tool 98 for threading or turning operations. The cutting tool 98 is retained in a suitable channel 100 in the tool holder by square-headed nuts 101.

It is apparent that any combination of the described tool holders may be mounted on and dismounted from the base 35 in quick succession for repeated cycles of machining operation without the necessity of making any adjustments whatsoever after the first cycle. In other words, the labor required for setting up the tools for the first cycle of operation suffices for all succeeding cycles. Since the setscrews 57 permit a wide range of angular adjustment of the various tool holders with respect to the common base 35, it is apparent that the cutting tools may, by presetting of the various setscrews 57, be adjusted over a wide range of vertical positions relative to the work axis of the machine.

In the first cycle of operation for producing a run of articles, the operator may note the index readings of the lathe for starting each operation in the cycle and in subsequent cycles of operation may prepare for each operation by manipulating the feed mechanism of the lathe with particular attention to the remembered index values instead of being guided primarily by observing the position of the cutting tool relative to the work piece in the lathe.

Our invention provides a tool holder which not only lends itself to quantity manufacture of duplicate parts, but which also is adapted for use in the powerful machine tools now in common use. These tools use, as cutters, tool steels that will take deep cuts at high speeds, and the tools are sufficiently heavy and rigid and have sufficient power to take such cuts and still work to close tolerances. The features of our invention which make our tool holder applicable to such work are well shown in Fig. 17, in which we illustrate the use of our tool holder in turning a cylindrical work piece or shaft 71 which turns in the direction of the arrow 72 about a work axis 73 perpendicular to the plane of the paper and passing through, and identified by, the point 73. The work axis lies in a plane 74—74 perpendicular to the plane of the paper and identified by the line 74 of Fig. 17.

The tool holder may be turned about a tool holder axis 75 perpendicular to the plane of the paper and identified by the point 75. The tool holder axis 75—75 lies in a plane 76—76 perpendicular to the plane of the paper and identified by the line 76—76. The cutting tool 53 engages the shaft 71 at a point 77, and the shaft exerts a downward pressure on the cutting tool 53 in the direction of the arrow 77—77. This downward pressure is within a zone 79 defined by the parallel planes 74—74 and 76—76. This downward pressure is very heavy and is transmitted to the screw 57 acting in the direction of the arrow 78—78 which is within the zone 79, and is substantially parallel to the planes 74—74 and 76—76. The direction of the downward force is also substantially perpendicular to the lower surface of the base 35 and the upper surface of the slide 31. It will be noted that the arrows 77—77 and 78—78 are close together so that a very rigid structure results.

The preferred forms and practice of our invention described in detail herein for the purpose of disclosure will suggest to those skilled in the art various substitutions and changes without departing from our underlying concepts, and we reserve the right to all such departures from our description that lie within the scope of our appended claims.

We claim as our invention:

1. A tool holder for holding a cutting tool so that it can be used in a lathe or other machine tool in which a work piece is rotated about a work axis and is acted on by the cutting tool, the cutting tool being connected to and carried by a compound slide which may be moved by conventional mechanism in a slide plane which is parallel to said work axis, which comprises: a base having a pivot socket formed therein; means for securing said base rigidly to the compound slide of the machine tool; a cutting tool holder having a pivot spindle formed thereon, said pivot spindle being symmetrical about a spindle axis, said pivot spindle being secured in said pivot socket so that spindle can turn about said spindle axis but is otherwise restrained from movement with relation to the base; adjustable means carried by said tool holder and contacting said base to establish a working position of said spindle in said socket with relation to said base about said spindle axis, which adjustment is not changed when the tool holder is removed from the base; and a cutting tool carried in said tool holder.

2. A tool holder for holding a cutting tool so that it can be used in a lathe or other machine tool in which a work piece is rotated about a work axis and is acted on by the cutting tool, the cutting tool being connected to and carried by a compound slide which may be moved by conventional mechanism in a slide plane which is parallel to said work axis, which comprises: a base having a pivot socket formed therein; means for securing said base rigidly to the compound slide of the machine tool; a cutting tool holder having a pivot spindle formed thereon, said pivot spindle being symmetrical about a spindle axis, said pivot spindle being secured in said pivot socket so that said spindle can turn about said spindle axis but is otherwise restrained from movement with relation to the base; a screw threaded in said tool holder in such a position that it can be adjusted in said tool holder, and also in such a position that if the tool holder is rotated about the tool axis in a positive direction the end of said screw strikes against said base to establish a working position for said tool holder with relation to said base, which adjustment is not changed when the tool holder is removed from the base; and a cutting tool carried in said tool holder.

3. A tool holder for holding a cutting tool so that it can be used in a lathe or other machine tool in which a work piece is rotated about a work axis and is acted on by the cutting tool, the cutting tool being connected to and carried by a compound slide which may be moved by conventional mechanism in a slide plane which is parallel to said work axis, which comprises: a base having a pivot socket formed therein; means for securing said base rigidly to the compound slide of the machine tool; a cutting tool holder having a pivot spindle formed thereon, said pivot spindle being symmetrical about a spindle axis, said pivot spindle being secured in said pivot socket so that said spindle can turn about said spindle axis but is otherwise restrained from movement with relation to the base; a screw threaded in said tool holder in such a position that it can be adjusted in said tool holder, and also in such a position that if the tool holder is rotated about the tool axis in a positive direction the end of said screw strikes against said base to establish a working position for said tool holder with relation to said base, the axis of said screw intersecting a plane joining the work axis and the spindle axis at a point between these axes, which adjustment is not changed when the tool holder is removed from the base; and a cutting tool carried in said tool holder.

4. A tool holder assembly for use in a lathe in which a work piece is rotated about a work axis and is acted on by a cutting tool, the cutting tool being carried by a compound slide which may be moved by conventional mechanism in a slide plane which is parallel to said work piece, which comprises: a base having a conical cavity therein; a tool holder having a conical spindle; means for seating said conical spindle in said conical cavity; tool securing means in said tool holder by means of which a cutting tool is secured in said tool holder; an adjusting screw in said tool holder which bears on said base at a point between the axis of said spindle and the work axis of the lathe when the spindle is secured in said cavity; and means for securing said base to said slide with the axis of the conical spindle substantially parallel to the axis of rotation of the work in the lathe.

ANTHONY KYLE.
JOHN A. JOHNSON.

CERTIFICATE OF CORRECTION.

Patent No. 2,389,858.  November 27, 1945.

ANTHONY KYLE, ET AL.

It is hereby certified that error appears in the printed specification of the above numbered patent requiring correction as follows: Page 2, first column, line 35, for "Fig. 6" read --Fig. 9--; page 3, first column, line 31, for "and" read --to--; line 55, for "and" read --end--; and that the said Letters Patent should be read with this correction therein that the same may conform to the record of the case in the Patent Office.

Signed and sealed this 19th day of March, A. D. 1946.

Leslie Frazer

(Seal)　　　　　　　　　First Assistant Commissioner of Patents.